United States Patent
De Haan

(10) Patent No.: US 6,957,009 B1
(45) Date of Patent: Oct. 18, 2005

(54) DATA ALLOCATION IN DVD RECORDING

(75) Inventor: Wiebe De Haan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 969 days.

(21) Appl. No.: 09/763,439

(22) PCT Filed: Jun. 23, 2000

(86) PCT No.: PCT/EP00/05891

§ 371 (c)(1),
(2), (4) Date: Feb. 21, 2001

(87) PCT Pub. No.: WO01/01416

PCT Pub. Date: Jan. 4, 2001

(30) Foreign Application Priority Data

Jun. 29, 1999 (EP) ............................................ 99202106

(51) Int. Cl.[7] .............................................. H04N 5/91
(52) U.S. Cl. ....................................... 386/95; 386/125
(58) Field of Search ........................... 386/45, 95, 105, 386/106, 124–126

(56) References Cited

U.S. PATENT DOCUMENTS 5,784,528 A    7/1998   Yamane et al.
5,870,523 A * 2/1999   Kikuchi et al. ............... 386/95
6,167,192 A * 12/2000   Heo ............................ 386/105
6,393,196 B1 * 5/2002   Yamane et al. ............. 386/126
6,504,993 B1 * 1/2003   Matsumoto .................. 386/95

FOREIGN PATENT DOCUMENTS

EP          724264 A       7/1996

OTHER PUBLICATIONS

"Information Technology–Generic Coding of Moving Pictures and Associated Audio: Sysytems", Int'l Organisation for Standardisation, Nov. 1994, ISO/IEC 13818–1.

* cited by examiner

Primary Examiner—Thai Tran
Assistant Examiner—Christopher Onuaku
(74) Attorney, Agent, or Firm—Michael E. Belk

(57) ABSTRACT

A method of recording an encoded bit stream, said encoded bit stream representing a plurality of video objects comprising a sequence of cells together constituting a part of an MPEG2 Program Stream, on a disc like record carrier, such as an optical disc. The method comprises recording multiple series of contiguously arranged video objects constituting multiple video object sets on said disc with corresponding multiple management information comprising attribute information of the corresponding video object set. The management information constituting with a video object set a playable video title. The multiple video object sets are combined into a single combined video object set and the multiple management information is preceding said combined video object set.

12 Claims, 6 Drawing Sheets

– 1 –

DATA ALLOCATION IN DVD RECORDING

The invention relates to a method for recording encoded information signals as recited in the preamble of claim 1 on a disc like record carrier, such as an optically readable disc. The invention further relates to a recording apparatus for performing the method.

The DVD-Video format for optically readable discs is defined in the DVD Specifications for Read-Only Disc, part 3: Video Specifications (version 1.0, August 1996). Relevant parts therefrom are being disclosed in for instance European Patent Application EP 724 264 and U.S. Pat. No. 5,784,528, respectively document D1 and D2 in the list of referred documents that can be found at the end of this description. Both documents are incorporated by reference herein.

The DVD-Video format as defined in the above mentioned Specifiations for READ-Only Disc and disclosed in D1 and D2 was created for storing movies and other video content on read-only DVD media. Some of the features of the DVD-Video format make it less suitable for real-time recording applications.

However, it is desirable to create and record video streams and associated data structures on rewritable media in real time which are should preferably be almost identical to the structures defined in the DVD-Video format. Such rewritable discs should be play back compatible with the majority of the installed base of consumer DVD-Video players. The method according to the invention describes a novel and inventive format for DVD-Video compatible real-time recording of video streams, referred to hereinafter to as Real Time DVD Video Recording or shortly DVD-Video Recording. The format defined is intended for home video recording on an optical medium which is playback compatible with DVD-Video players.

The above-mentioned DVD-Video format demands that data for a Video Title Set (VTS) be allocated contiguously. This implies that Titles cannot be fragmented, except for interleaving. A Title in this respect is defined to be a user accessible unit in Title Search Pointer table of the DVD-Video format. This requirement implies that a user should see a disc as a linear recording space equivalent to a tape where Titles are presented to user in order of recording.

However, this gives all kinds of problems when part of the data is overwritten with new recordings such as occurs with adding, appending, overwriting or deleting a Title.

A possible solution would be to organize all titles in one Video Title Set, preceded by one Video Title Set Information area (VTSI) and a corresponding Video Manager General Information area (VMGI). However, this has the disadvantage that no longer can be distinguished between different parameter sets for each Title. Such as for example the video parameters picture resolution, frame rate, aspect ratio and bit rate.

In consequence, amongst other things, it is an object of the invention to obviate the above-mentioned disadvantages. According to one of its aspects a method of recording to the invention is characterized as recited in the characterizing part of claim 1.

Now each playable title may have its own management information. Locating the management information in advance of all video objects has the advantage that the video object sets may be regarded as one, composite video object set. This leads to a simplified addressing.

Further advantageous aspects of the invention are recited in other, dependent claims.

These and further aspects and advantages of the invention will be apparent from and elucidated in more detail hereinafter with reference to the disclosure of preferred embodiments, in particular with reference to the appended figures in which, FIG. 1 illustrates a linear tape model in view of some typical video recording actions;

FIG. 2 illustrates the structure of the video area on a disc according to the DVD Video format; while

Figure 6:
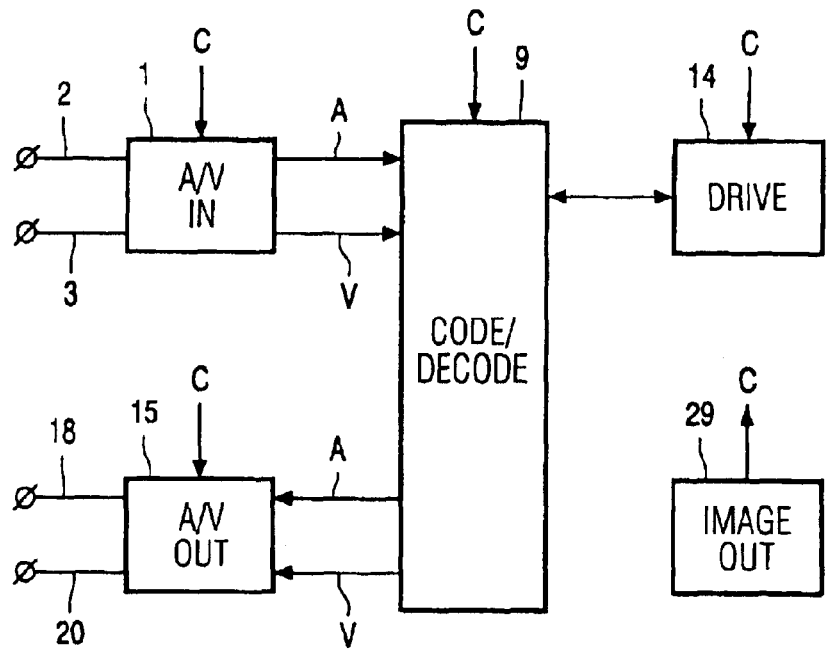
Figure 7:
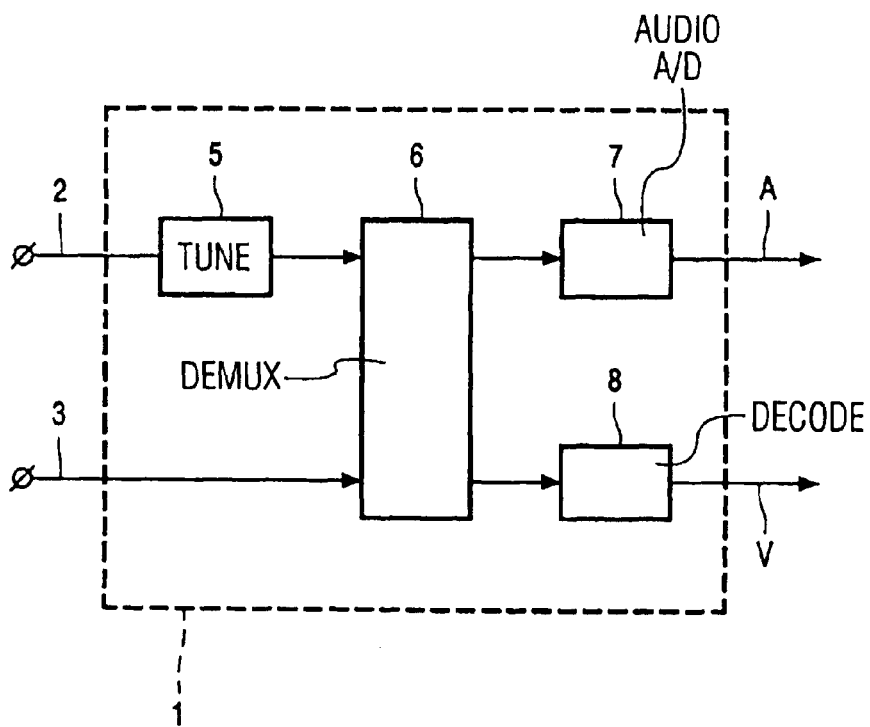
Figure 8:
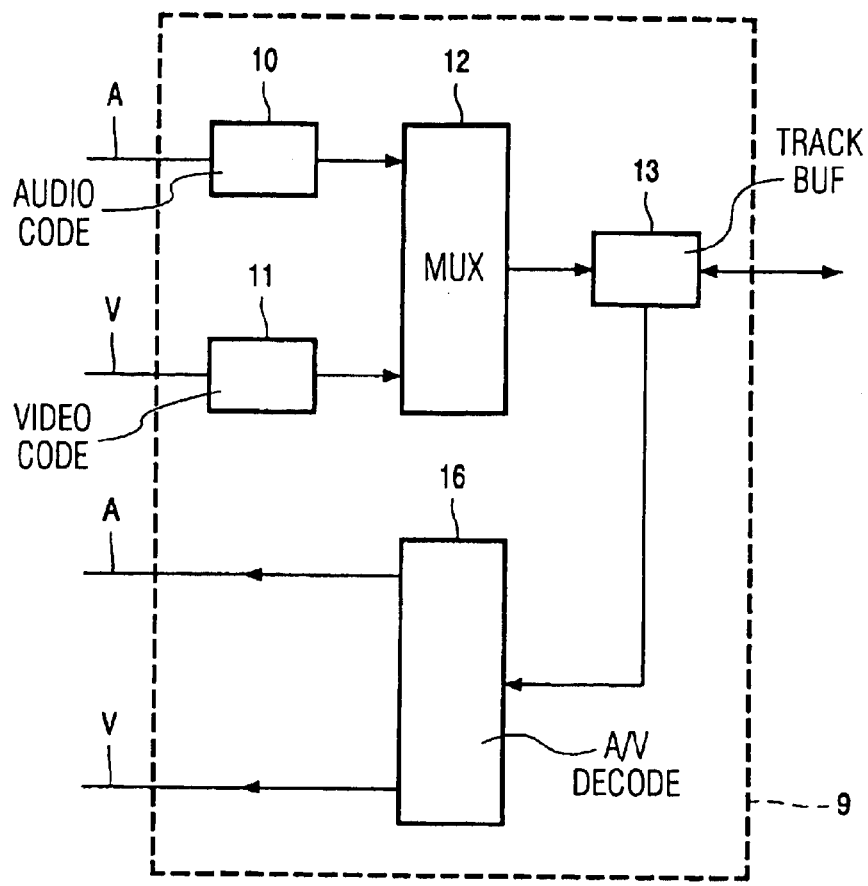
Figure 9:
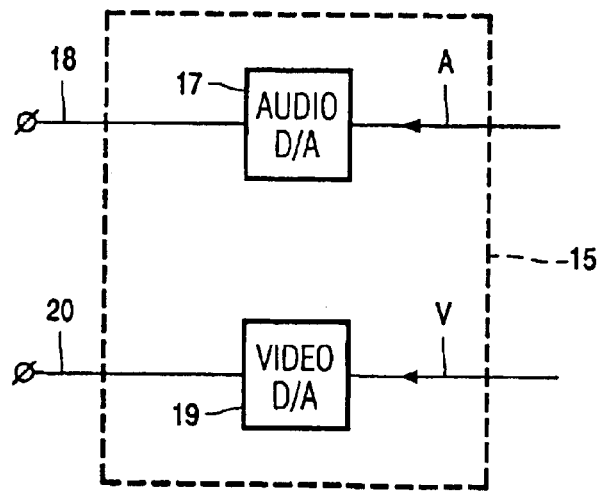
Figure 10:
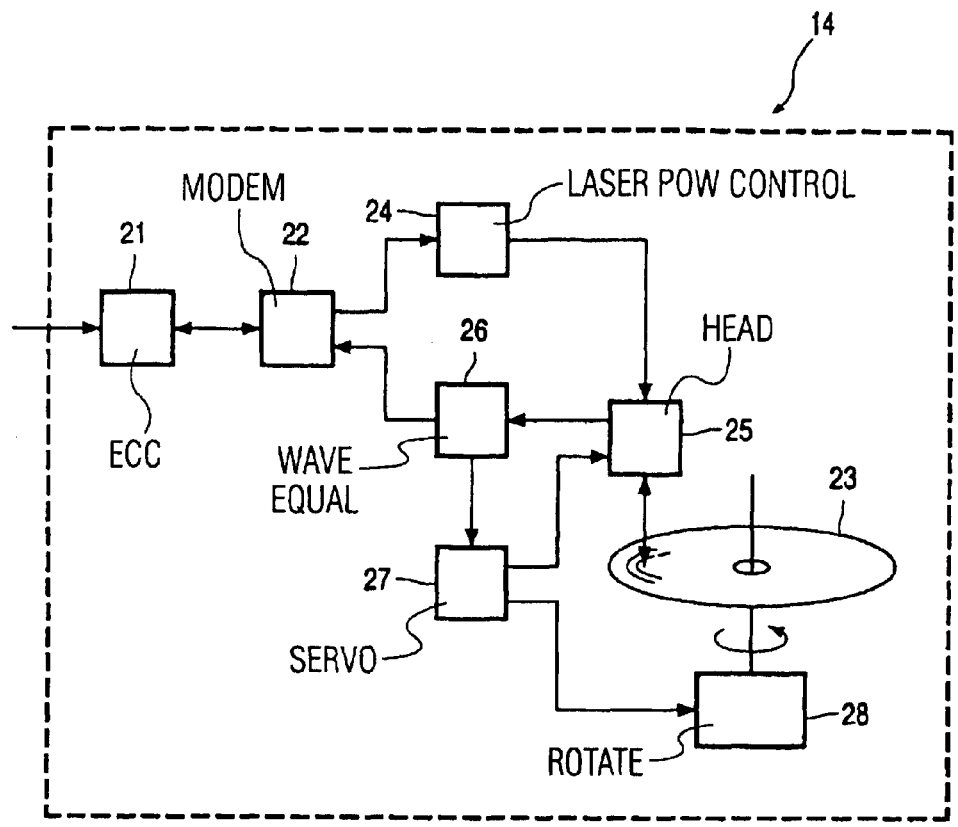
Figure 11:
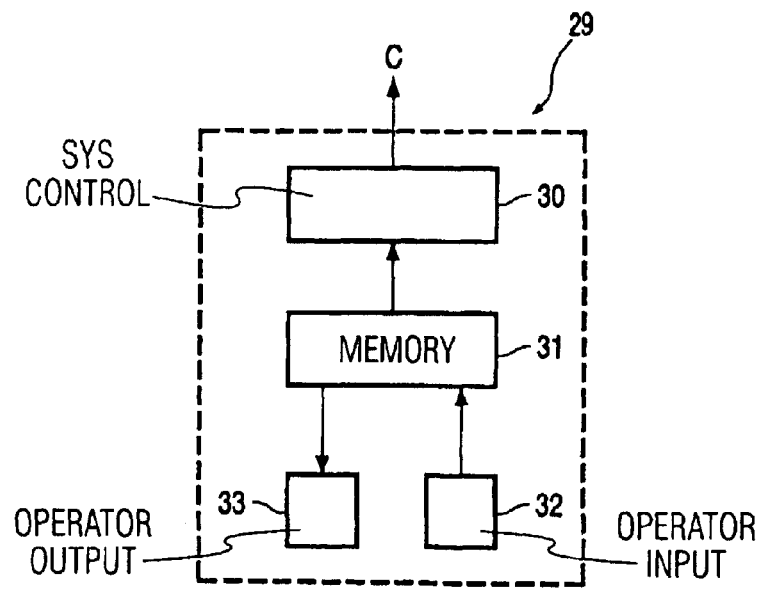

FIG. 6 shows a recording apparatus according to a first embodiment of the invention, the respective units therefrom being illustrated in more detail in the following figures of which FIG. 7 shows an A/V input unit;
FIG. 8 shows a CODEC unit;
FIG. 9 shows an A/V output unit;
FIG. 10 shows a drive unit, and
FIG. 11 shows a system control unit.

FIG. 1 illustrates the concept of a linear tape model in view of some typical recording actions. FIG. 1A illustrates a recording of a first Title 1 in a linear address space of a DVD disk with a remaining free space 2. According to the DVD-Video format, the data is allocated contiguously. FIG. 1B illustrates adding a Title 2 after the first Title 1. FIG. 1C shows appending to the existing Title 1, the append part indicated by the arrow. Part of the Title 2 of FIG. 1C is overwritten. FIG. 1D illustrates partly overwriting the Title 2. FIG. 1E shows deleting Title 3 of FIG. 1D.

Figure 1A:
Figure 1B:
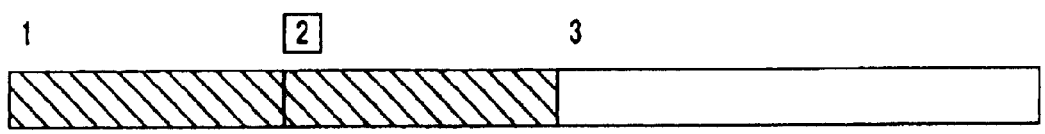
Figure 1C:
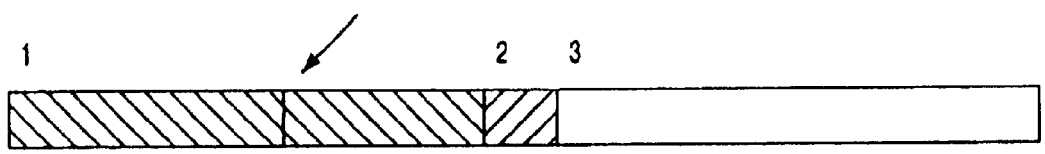
Figure 1D:
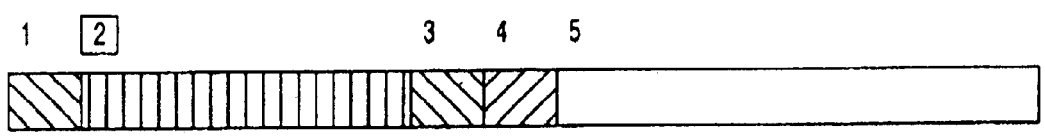
Figure 1E:
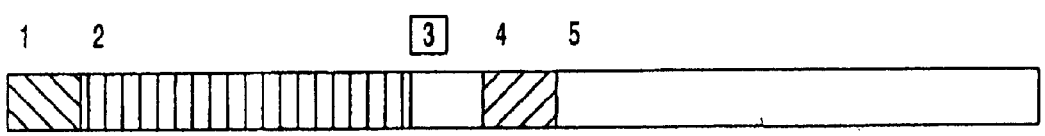
Figure 2:
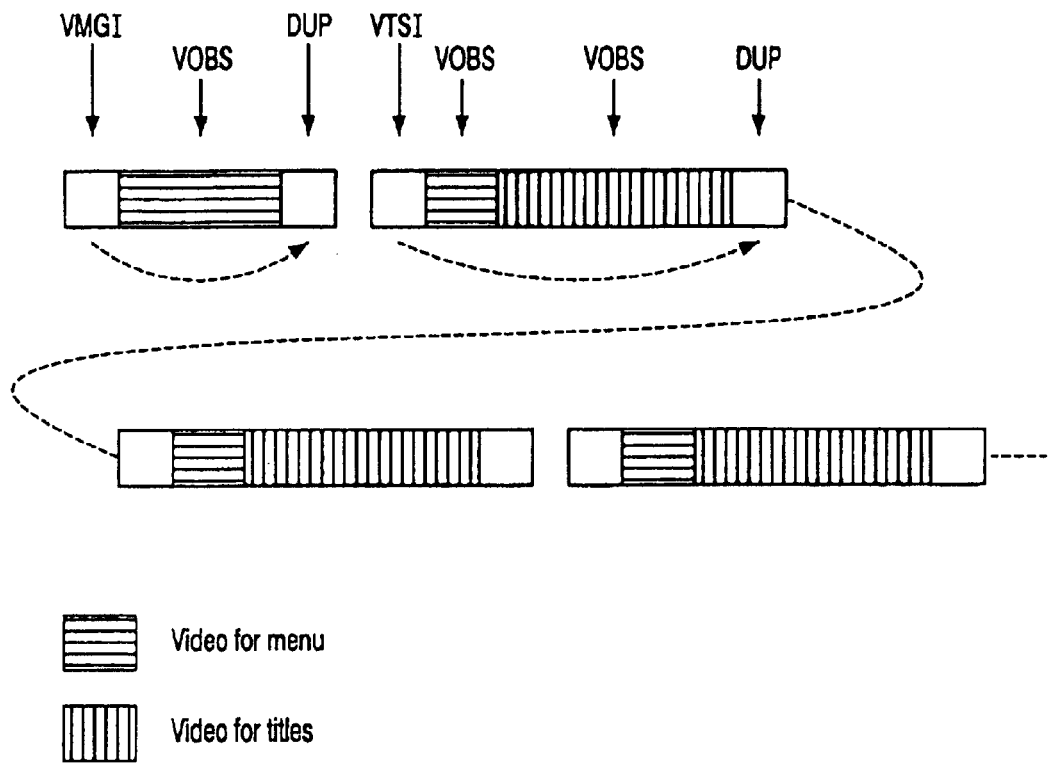

FIG. 2 illustrates the DVD video area according to the DVD Video format. It is noted a Lead_in zone, a Lead_out zone and a file system, although present, are not depicted in this figure. The DVD Video area starts with a Video Manager Area (VMG) comprising a Video Manager General Information (VGMI) area, an Video Object Set (VOBS) area and a Duplicate (DUP) area containing a copy of the Video Manager General Information (VGMI) area. A Video Object Set (VOBS) is a collection of contiguously recorded VOBs as will be illustrated hereinafter with reference to FIG. 4. The Video Manager (VMG) contains information about the recorded video data and a Title Menu. This is a menu that gives the user access to Play Lists and optionally to Full Titles.

A Play List is a Title representing a play back sequence of Cells from one Recording. A Cell is a sequence of one or more Video Object Units (VOBU). The first VOBU of a Cell shall contain video data. A Cell is the basic presentation unit for the Program Chains (PGC), which is a playback sequence of Cells for the presentation of a Menu or a Title.

A full Title represents one Recording. When a Full Title is played, all complete Cells contained in the Recording are played in the order of data allocation in the Video Object Set for Titles in a Video Title Set. (VTSTT_VOBS).

A Recording is a contiguous piece of the Video Object Set for Titles in a Video Title Set (VTSTT_VOBS). A Video Object (VOB) is (a part of) a sequence of contiguously recorded Cells, together constituting (a part of) an MPEG-2 Program Stream containing MPEG-2 Program Stream packs such as defined in ISO/IEC 13818-1 related to MPEG-2 systems, document D3 in the list of referred documents that can be found at the end of this description.

The Title Search Pointer Table is one of the elements of the Video Manager. This table lists all available Play Lists and Full Titles on the disc. It is a starting point for finding the data that is relevant for playing back a Title.

Free Space is a recording which is represented by a Free Space Title in the Title Search Pointer Table. If the last Recording is free space, it is not represented in this table. A Free Space Title is a Full Title or Play List Title which cannot be played back as the related Program Chain Information contains a pre-command to prevent this. Time Play( ), Time_Search( ), PTT Play( ) and PTT_Search( ) for a Free Space Title are blocked. The Cell information in the Program Chain of a Free Space Title may not be reliable.

After the Video Manager (VMG) several Video Title Sets (VTS#1, VTS#2.) may follow, each Video Title Set (VTS) preceded by Video Title Set Information (VSTI) containing information with respect to the corresponding Video Title Set (VTS) such as audio and video parameters. Following the Video Title Set Information (VTSI) are corresponding Video Object Set (VOBS) containing MPEG-2 video for respectively Menus and Titles. Each Video Title Set close with a Duplicate area (DUP) containing a copy of the Video Title Set Information (VTSI).

Figure 3:
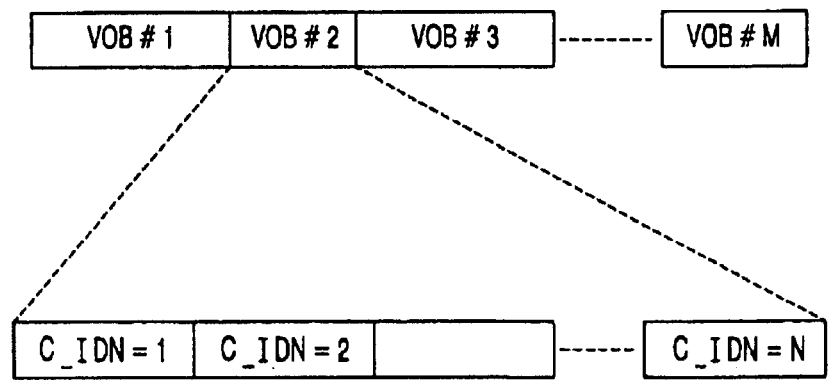
FIG. 3 shows in more detail the arrangement of a Video Object Set (VOBs) of FIG. 1 in Video Objects (VOB) and Cells.

FIG. 3 illustrates in more detail the arrangement of a Video Object Set (VOBs) of FIG. 2 in contiguously recorded Video Objects (VOB#1, VOB#2, . . . ) and Cells (C_IDN=1, C_IDN=2, . . . ). VOBs which are used for the menus are stored in the Video Manager VOBS (VMGM_VOBS). VOBs which are used for the Titles are stored in the VTS Title VOBS (VTSTT_VOBS).

Figure 4:
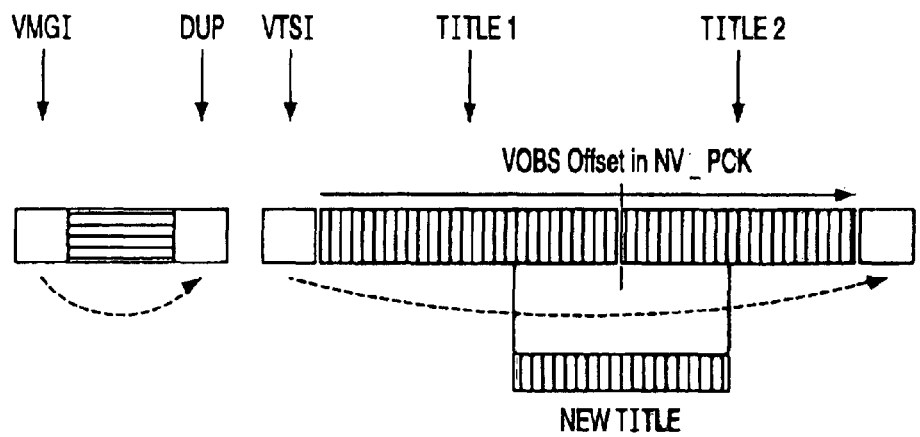
FIG. 4 shows a possible arrangement of all Titles in one Video Title Set.

FIG. 4 shows a possible arrangement of all Titles in one Video Title Set. Following the Video Manager (VMG) area, is only one Video Title Set preceded by one Video Title Set Information (VTSI) arca and a corresponding Duplicate (DUP) area. The Video Title Set (VTS) contains in this example two Titles (Title 1 and Title 2). The corresponding Presentation Control Information (PCI) and Data Search Information (DSI), not shown in FIG. 4, is dispersed in corresponding Navigation Packs (NV_PCK) in each Video Object Unit (VOBU) of the Video Object Set VOBS. According to the DVD Video format, a Video Title Set (VTS) has a separate reference point in the Navigation Pack (NV_PCK). Each Navigation Pack (NV_PCK) has a Logical Block Number (NV_PCK_LBN) that is relative to this reference point (VOBS Offsett in NV-PCK).

When the real time data of the Video Object Set (VOBS) is overwritten by a New Title, the Video Title Set Information (VTSI) and the Video Manager Information (VMGI) are updated.

Figure 5A:
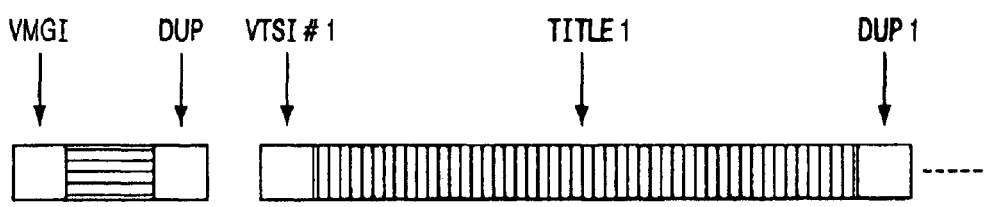
FIG. 5 shows an arrangement of multiple Video Title Sets according to an embodiment of the invention.
Figure 5B:
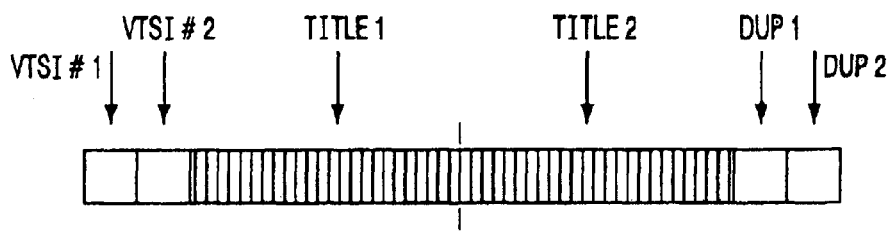
Figure 5C:
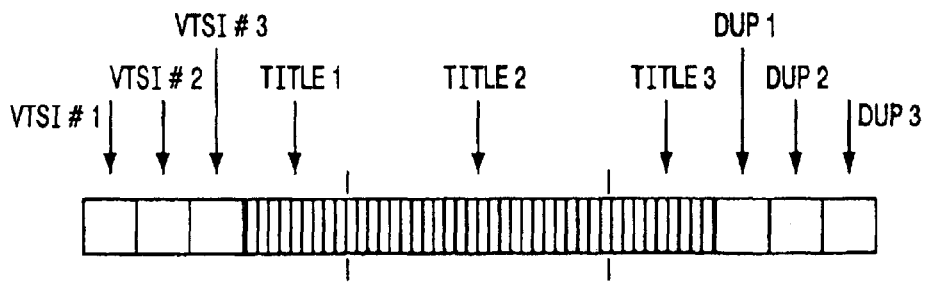

However, the embodiment according to FIG. 4, is limited in that the Video Title Set (VTS) may only contain one parameter set for video and audio. Such as for example parameters related to aspect ratio, Long Play mode versus Normal Play mode, picture size and Video Coding Mode (MPEG1 or MPEG2) and so on. An embodiment according to the invention that overcomes this disadvantage will be disclosed with reference to FIG. 5 FIG. 5 shows an arrangement of multiple Video Title Sets according to an embodiment of the invention. This arrangement allows multiple interleaved Video Title Sets (VTS#1, VTS#2 . . . ). The real time data of the Video Title Sets (TITLE1, TITLE2, TITLE3) is arranged consecutively while the corresponding Video Title Set Information (VTSI#1, VTSI#2, VTSI#3) is arranged separately. When real time data is overwritten, this info structures are adapted such that only references to the remaining data structures are made. Players do not notice that the real time data of various Video Title Sets is arranged in an interleaved manner. With reference to FIG. 5A, which shows only one Title (TITLE1), FIG. 5B shows an additional Title (TITLE2) and FIG. 5C two additional Titles (TITLE2 and TITLE3). It is noted that each Navigation Pack (NV-PCK) has a Relative Block Number (NV_PCK_LBN) that is relative to the first sector containing real time data of any Video Title Set (VTS). This is regarded as the common reference point for all real time data.

The Video Title Set Information (VTSI#1, VTSI#2, VTSI#3) files are located in a separate area on the disc, preferably in front of any real time data structure. This is also done for the corresponding Duplicate files (DUP1, DUP2, DUP3). Each Video Title Set is allowed to have its own video and audio parameters such as defined in the corresponding Video Title Set Information (VTSI)

FIG. 6 shows a recording apparatus according to a first embodiment of the invention. The recording apparatus is composed of several units. One unit is the A/V input unit 1. The A/V input unit 1 receives image and sound signals at antenna input terminal 2 and an external sound/image input terminal 3. The antenna input terminal 2 is adapted to receive broadcasted modulated A/V signals transmitted by either satellite, terrestrial or cable source. The external sound/image input terminal 3 is adapted to receive a non modulated audio signal or a non-modulated video signals generated directly by respectively an audio or a video source.

FIG. 7 illustrates the A/V input unit 1 in more detail. A tuner 5, which is connected to the antenna input terminal 2, demodulates the modulated A/V antenna signals and outputs the demodulated signals to a suitable A/V demultiplexing unit 6 for separating audio signals from video signals. An audio A/D converter unit 7 outputs a digital audio signal A and a NTSC/PAL/SECAM decoding unit 8, comprising a video A/D converter, outputs a digital video signal V. These signals A and V are outputted to a encoding/decoding unit 9, which is illustrated in more detail in FIG. 8. The encoding/decoding unit 9 compresses and encodes the signals A and V, respectively by an audio encoder 10 and a video encoder 11, converts them to a multiplexed and compressed stream conforming to Video Recording specifications, employing a multiplexer 12. To this purposes the audio encoder 10 and video encoder 11 are adapted to perform source compression according to a specific standard for compression, such as for example MPEG-2 for audio and video.

The compressed and multiplexed stream is submitted via a track buffer 13, which absorbs rate fluctuations stemming from intermittent recording and data reproduction from a disc, to a drive unit 14. The encoding/and decoding unit 9 also expands a compressed stream read from a recording medium by the drive unit 14 and outputs separately an audio signal A and a video signal V to the A/V output unit 15. To this purpose, the encoding/decoding unit 9 comprises a suitable A/V decoder 16 for decoding the compressed audio and video source signals.

The A/V output unit 15, which is illustrated in more detail in FIG. 9, comprises an audio D/A converter 17 for outputting sound signals to an external sound output terminal 18. The A/V output unit 15 further comprises a video encoder— D/A converter unit 19 for outputting video signals to an external image output terminal 20.

FIG. 10 illustrates the drive unit 14 in more detail. This unit 14 receives the compressed stream generated by the encoding/decoding unit 9, and adds an error-correction code by a suitable error correction processing unit 21 to the stream. Next a channel modulation/demodulation unit 22 converts the stream with error-correction code to channel bits adapted for recording on a recording medium 23. In case of a DVD-disc the EFM+ modulation scheme is being applied. Recording and reading in case of a recording medium 23 of the optical type, is performed by a laser comprised in an optical head unit 25. A laser power control unit 24 is controlling the laser. Reflected signals from the recording medium 23 are being converted by an amplifier and waveform equalizer circuit 26 into two-value signals. The resultant compressed stream is further demodulated by the modulating/demodulation unit 22, error corrected by the error correction processing unit 21 and outputted to the encoding/decoding unit 9 via track buffer 13.

A servo circuit 27, connected to the amplifier and waveform equalizer circuit 26, controls the positioning of the optical head unit 25 relative to the recording medium 23 and the rotational velocity of the recording medium 23 by controlling rotational driving means 28.

A system control unit 29, as shown in FIG. 1, controls each block and perform file control, control information management and track buffer control. To this purpose a system control processing unit 30 is provided that is being connected to memory means 31 loaded with a suitable operation system. Operator input means 32 and operator output means 33 are connected to the memory means 31. The operator input means 32 comprising for instance keying means and the operator output means comprising display means.

Although the invention has been described with reference to preferred embodiments thereof, it is to be understood that these are not limitative examples. Thus, various modifications thereof may become apparent to those skilled in the art, without departing from the scope of the invention, as defined by the claims. The invention can be implemented by means of both hardware and software, and that several "means" may be represented by the same item of hardware. Further, the invention lies in each and every novel feature or combination of features. It is also remarked that the word 'comprising' does not exclude the presence of other elements or steps than those listed in a claim. Any reference signs do not limit the scope of the claims.

LIST OF REFERRED DOCUMENTS (D1) European Patent Application EP 724 264
(D2) U.S. Pat. No. 5,784,528
(D3) ISO/IEC 13818-1: 1995 Information Technology—Generic Coding of moving pictures and associated audio information: Part 1: Systems (MPEG2-systems)

What is claimed is:

1. A method of recording an encoded bit stream, said encoded bit stream representing a plurality of video objects comprising a sequence of cells together constituting a part of an MPEG2 Program Stream, on a disc like record carrier, said method comprising:
 recording a series of contiguously arranged video objects as a video object set on said disc,
 recording management information comprising attribute information of the recorded video object set, wherein said management information precedes said video object set and constitutes therewith a playable video title, characterized by,
 recording at least a second series of contiguously arranged video objects constituting a second video object set and corresponding second management information on said disc, wherein
 the at least two video object sets are combined into a single video object set and the first and the at least second management information precedes said combined video object set.

2. A method according to claim 1, wherein each video object contains navigation information employing a common reference address.

3. A method according to claim 2, wherein said reference address is at the beginning of the first series of video objects following the management information.

4. A method according to claim 3, wherein the attribute information comprises picture resolution and/or video coding mode of the video object set.

5. A method according to claim 4, wherein a playable video title, a video object set and the management information corresponds respectively to a Video Title Set (VTS), a Video Title Set Video Object Set (VTSTT-VOBS) and the Video Title Set Information (VTSI) of the DVD-Read Only Video Specification.

6. A method according to claim 5, wherein the navigation information corresponds to a Navigation Pack (NV-PCK) of the DVD-Read Only Video Specification and the common reference address corresponds to the first logical block number of the first Video Object Set of the series of Video Objects Sets.

7. A recording apparatus for recording an encoded bit stream, representing a plurality of video objects comprising a sequence of cells together constituting a part of an MPEG2 Program Stream, on a disc like record carrier, the recording apparatus comprises
 recording means for recording a series of contiguously arranged video objects as a video object set on said disc and for recording management information comprising attribute information of the recorded video object set,
 wherein said management information precedes said video object set and constitutes therewith a playable video title,
 characterized in that, the recording apparatus comprises
 system control means adapted to control recording of at least a second series of contiguously arranged video objects constituting a second video object set and corresponding second management information on said disc, wherein
 the at least two video object sets are combined into a single video object set and the first and the at least second management information precedes said combined video object set.

8. A recording apparatus according to claim 7, characterized in that,
 the system control means are adapted to include in each video object navigation information employing a common reference address.

9. A recording apparatus according to claim 8, wherein said common reference address is at the beginning of the first series of video objects following the management information.

10. A recording apparatus according to claim 9, characterized in that,
 the system control means are adapted to include picture resolution and/or a video coding mode of the video object set as attribute information.

11. A recording apparatus according to claim 10, wherein a playable video title, a video object set and the management information corresponds respectively to a Video Title Set (VTS), a Video Title Set Video Object Set (VTSTT-VOBS) and the Video Title Set Information (VTSI) of the DVD-Read Only Video Specification.

12. A recording apparatus according to claim 11, wherein the navigation information corresponds to a Navigation Pack (NV-PCK) of the DVD-Read Only Video Specification and the common reference address corresponds to the first logical block number of the first Video Object Set of the series of Video Objects Sets.

* * * * *